(12) United States Patent
Logan et al.

(10) Patent No.: US 6,883,444 B2
(45) Date of Patent: Apr. 26, 2005

(54) PROCESSES AND SYSTEMS FOR USING BIOMINERAL BY-PRODUCTS AS A FUEL AND FOR $NO_X$ REMOVAL AT COAL BURNING POWER PLANTS

(75) Inventors: Terry J. Logan, Columbus, OH (US); Ervin L. Faulmann, Toledo, OH (US)

(73) Assignee: N-Viro International Corporation, Toledo, OH (US)

( * ) Notice: Subject to any disclaimer, the term of this patent is extended or adjusted under 35 U.S.C. 154(b) by 0 days.

(21) Appl. No.: 10/034,118

(22) Filed: Jan. 3, 2002

(65) Prior Publication Data

US 2002/0152937 A1 Oct. 24, 2002

Related U.S. Application Data

(63) Continuation-in-part of application No. 09/839,112, filed on Apr. 23, 2001.

(51) Int. Cl.[7] .............................. F23G 5/02; F23B 7/00; F23D 1/00

(52) U.S. Cl. ..................... 110/345; 110/261; 110/219; 110/342; 110/346; 110/347

(58) Field of Search ................................ 210/750, 749, 210/609, 903, 770, 774; 110/261, 219, 297, 342, 344, 346, 345, 347

(56) References Cited

U.S. PATENT DOCUMENTS

| | | | |
|---|---|---|---|
| 3,476,683 A | 11/1969 | Liljegren | 210/8 |
| 3,741,890 A | * 6/1973 | Smith et al. | 210/40 |
| 3,877,920 A | 4/1975 | Carlberg | 71/21 |

(Continued)

FOREIGN PATENT DOCUMENTS

| | | | |
|---|---|---|---|
| DE | 3916597 A1 | 11/1990 | |
| EP | 0 935 723 A2 | 3/2000 | |
| EP | 0 985 723 A2 | 3/2000 | |
| JP | 03059303 A | 3/1991 | ........... F23C/11/00 |

OTHER PUBLICATIONS

*Sludge Co-combustion: The cost effective solution for sewage sludge management*, www.dirkgroup.com/cocombustion.htm, pp1–3.

*Alkaline Reagents in the N-Viro Process and Effects on N-Viro Soil*, N-Viro Soil Research and Experience on Product Use 8, pp 1–2 (1996).

M. McCoy, *Cleaning up the air with chemicals*, C&EN Northwest News Bureau, pp. 35, 36, 38 (2001).

*Primary Examiner*—Kenneth Rinehart
(74) *Attorney, Agent, or Firm*—Kenyon & Kenyon (57) ABSTRACT

Processes and systems are provided that include introducing ammonia liberated from organic waste to a coal burner in a coal burning power plant, preferably for $NO_x$ removal at the power plant. The ammonia is preferably either ammonia liberated upon drying a mixture of organic waste and coal combustion by-products or ammonia liberated when organic waste is mixed with coal combustion by-products and one or more alkaline additives. Also provided are processes and systems of fueling a coal burner of a power plant with coal and either a dried mixture of organic waste and coal combustion by-products, or a mixture of organic waste, coal combustion by-products and one or more alkaline additives. The present invention is further directed to mixtures of either organic waste and coal combustion by-products, or mixtures of organic waste, coal combustion by-products and alkaline additives made by the processes of the present invention.

23 Claims, 3 Drawing Sheets

| | | | | | | | | |
|---|---|---|---|---|---|---|---|---|
| 4,079,003 | A | | 3/1978 | Manchak ........................ 210/46 |
| 4,143,122 | A | | 3/1979 | Laufhütte et al. ......... 423/574 R |
| 4,159,682 | A | | 7/1979 | Fitch et al. ................... 110/245 |
| 4,255,129 | A | | 3/1981 | Reed et al. .................... 432/13 |
| 4,462,341 | A | * | 7/1984 | Strohmeyer et al. ......... 122/4 D |
| 4,532,873 | A | * | 8/1985 | Rivers et al. ................ 110/347 |
| 4,554,002 | A | | 11/1985 | Nicholson ...................... 71/12 |
| 4,756,890 | A | | 7/1988 | Tang et al. |
| 4,781,842 | A | | 11/1988 | Nicholson .................... 210/751 |
| 4,787,323 | A | | 11/1988 | Beer et al. ................... 110/346 |
| 4,902,431 | A | | 2/1990 | Nicholson et al. ........... 210/751 |
| 4,932,335 | A | * | 6/1990 | Bruckner et al. ............. 110/234 |
| 4,946,382 | A | | 8/1990 | Kobayashi et al. ............. 431/8 |
| 4,970,803 | A | | 11/1990 | Keller ............................ 34/10 |
| 4,997,572 | A | | 3/1991 | Wurtz ......................... 210/710 |
| 5,001,994 | A | * | 3/1991 | Morimoto et al. ............ 110/342 |
| 5,135,664 | A | | 8/1992 | Burnham ..................... 210/751 |
| 5,196,043 | A | | 3/1993 | Wurtz ............................ 71/12 |
| 5,211,723 | A | | 5/1993 | Khan et al. ................. 48/197 R |
| 5,217,624 | A | | 6/1993 | Yamane et al. |
| 5,229,011 | A | | 7/1993 | Christy, Sr. et al. ......... 210/751 |
| 5,234,468 | A | * | 8/1993 | Khan ........................ 48/197 A |
| 5,275,733 | A | | 1/1994 | Burnham ..................... 210/609 |
| 5,277,826 | A | | 1/1994 | Burns et al. ................. 210/751 |
| 5,307,765 | A | | 5/1994 | Virr ........................... 122/4 D |
| 5,346,616 | A | | 9/1994 | Christy, Sr. et al. ......... 210/179 |
| 5,417,861 | A | | 5/1995 | Burnham ..................... 210/609 |
| 5,422,015 | A | | 6/1995 | Angell et al. ................ 210/751 |
| 5,429,645 | A | * | 7/1995 | Benson et al. ................. 44/589 |
| 5,447,703 | A | * | 9/1995 | Baer et al. .................. 423/235 |
| 5,490,907 | A | | 2/1996 | Weinwurm et al. ........... 203/29 |
| 5,525,239 | A | | 6/1996 | Duske ......................... 210/739 |
| 5,746,006 | A | | 5/1998 | Duske et al. .................. 34/136 |
| 5,837,142 | A | | 11/1998 | Mullerheim et al. ......... 210/650 |
| 5,849,050 | A | | 12/1998 | Wolf ........................ 48/197 R |
| 5,853,590 | A | | 12/1998 | Burnham ..................... 210/609 |
| 5,937,770 | A | | 8/1999 | Kobayashi et al. ........... 110/263 |
| 5,980,858 | A | * | 11/1999 | Fujimura et al. ............ 423/655 |
| 6,048,510 | A | | 4/2000 | Zauderer .................... 423/235 |
| 6,056,880 | A | | 5/2000 | Boss et al. ................... 210/695 |
| 6,063,355 | A | * | 5/2000 | Fujimura et al. ............ 423/359 |
| 6,168,688 | B1 | * | 1/2001 | Clot et al. ..................... 201/25 |
| 6,234,093 | B1 | | 5/2001 | Finker et al. ................ 110/266 |
| 6,237,246 | B1 | | 5/2001 | Millard ........................ 34/343 |
| 6,280,695 | B1 | * | 8/2001 | Lissianski et al. ........ 423/239.1 |
| 6,298,796 | B1 | | 10/2001 | Okazaki et al. ............. 110/345 |

* cited by examiner

PROCESSES AND SYSTEMS FOR USING BIOMINERAL BY-PRODUCTS AS A FUEL AND FOR NO$_x$ REMOVAL AT COAL BURNING POWER PLANTS

This application is a continuation-in-part of co-pending application U.S. Ser. No. 09/839,112, filed Apr. 23, 2001 the subject matter of which is incorporated by reference hereto.

FIELD OF THE INVENTION

The present invention is directed to processes and systems at coal burning power plants, which include introducing ammonia liberated from organic waste to a coal burner in the power plant.

The present invention is also directed to processes and systems of fueling a coal burner of a power plant with coal and either a dried mixture of organic waste and one or more coal combustion by-products, or a mixture of organic waste, one or more coal combustion by-products, and optionally one or more alkaline additives.

The present invention is further directed to dried mixtures of organic waste and coal combustion by-products or mixtures of organic waste, coal combustion by-products and optional alkaline additives made by the processes of the present invention.

BACKGROUND OF THE INVENTION

Mineral by-products have been used in stabilizing semi-solid, odorous organic waste through bulk drying, odor absorption, and granulation (see e.g., U.S. Pat. Nos. 3,877,920 and 4,554,002). In addition, mineral materials including sand, diatomaceous earth, perlite, and various mineral reagent powders have been used in conjunction with fluidized heating, drying and burning of sludges and oily waste (see e.g., U.S. Pat. Nos. 4,159,682, 4,787,323, 4,970,803, 5,490,907). However, existing thermal dryers have ongoing problems with drying waste high in organics, particularly sewage sludges, in the waste sticking to dryer surfaces, charring and producing burnt organic matter odors, and catching on fire.

Organic waste has traditionally been disposed of by incineration, primarily in stand-alone plants designed for a particular waste. Wet waste, such as dewatered sewage sludge filter cake, requires supplemental fuel to initiate and sustain burning, and sludges are not self-burning until solids contents are greater than about 30%. Dry organic waste such as paper and cardboard are net energy producers and municipal refuse incinerators that use these feedstocks are capable of significant power generation. Likewise, dried animal manures like broiler chicken litter, which contains sawdust that is used as bedding, can have a solids content in excess of 75% and can be incinerated with out supplemental fuel. Processes of more efficiently disposing of organic waste are desirable.

NO$_x$ created during the burning of coal can react with volatile organic compounds in the presence of heat and sunlight to form ozone. Gaseous ammonia, in the form of commercial anhydrous ammonia and its main derivative, urea, are currently used in treating fossil fuel combustion exhausts for NO$_x$ removal. This is a very expensive process, however. Therefore, inexpensive sources of ammonia or methods of recycling ammonia are desirable.

SUMMARY OF THE INVENTION

The present invention is directed to processes and systems at coal burning power plants, which include introducing ammonia liberated from organic waste to a coal burner in the power plant. The ammonia may be ammonia that is liberated upon drying a mixture of organic waste and one or more coal combustion by-products, preferably having a pH of at least 9.5, or the ammonia may be ammonia that is liberated when organic waste is mixed with one or more coal combustion by-products, such as fly ash, and one or more alkaline additives. Preferably, the present processes and systems remove NO$_x$ at the power plant. The liberated ammonia that is introduced to the coal burner by the present processes and systems, may supplement commercial anhydrous ammonia or urea added to the coal burner, for example, for NO$_x$ removal.

The present invention is also directed to processes and systems of fueling a coal burner of a power plant with coal and either a dried mixture of organic waste and coal combustion by-products, or a mixture of organic waste, coal combustion by-products and optionally alkaline additives. The coal is preferably pulverized coal. In this embodiment, the dried mixture of organic waste and coal combustion by-products or the mixture of organic waste, coal combustion by-products and alkaline additives, is optionally a source of supplemental fuel to the coal burner.

The present invention is further directed to dried mixtures of organic waste and coal combustion by-products made by the processes of the present invention, and to mixtures of organic waste, coal combustion by-products and optional alkaline additives made by the processes of the present invention. The mixtures of the present invention optionally additionally contain lime.

Non-limiting examples of organic waste used in the process of the present invention include, but are not limited to, dewatered sewage sludge filter cake, various animal manures, pulp and paper waste, fermentation waste, shredded paper and cardboard, food waste (such as food processing waste), and other organic industrial waste and mixtures thereof.

Certain embodiments of the present invention do not require drying, such as in the case of organic wastes that are already dry. However, in embodiments that include drying, a mixture of organic waste and one or more coal combustion by-products (optionally including one or more alkaline additives) is dried to preferably at least 50% solids, more preferably at least 75% solids, even more preferably at least 90% solids. The drying preferably takes place in a direct or indirect dryer and preferably uses waste heat from the power plant.

DETAILED DESCRIPTION

The present invention will now be described in detail with regard to specific preferred embodiments of the invention, it being understood that these embodiments are intended only as illustrative examples and the invention is not to be limited thereto.

Coal-fired power plants must deal with the problems of NO$_x$ removal from exhaust gases, renewable fossil fuel power generation, odor, and dissipation of waste energy. The present inventors have arrived at processes and systems that advantageously synergistically incorporate processes of releasing ammonia from organic waste and reducing $NO_x$ emissions at a power plant, which utilizes waste (including for example, heat and/or by-products) from each process in the other process.

Organic waste produces ammonia under certain conditions, which excess ammonia may be used for example, to reduce $NO_x$ emissions at a power plant. The present invention provides processes at coal burning power plants, which include supplying liberated ammonia from waste treatment to a coal burning power plant, to preferably remove $NO_x$ from the plant.

Combining organic waste with one or more coal-combustion by-products and drying the organic waste is a method by which ammonia may be released from the waste. Drying waste, which typically contains from about 12 to about 75% solids, depending on waste type, is energy intensive. In the present invention, in which drying is conducted at a power plant, waste heat from the plant can be used as a heat source in drying the organic waste. Power plants produce several types of waste heat: hot exhaust gases, hot ash, steam and hot water. These sources are readily available for organic waste drying. Whereas, if the power plant did not have a recipient for the excess heat, the heat would have to be further treated, e.g., excess steam or hot water must be cooled before they can be discharged back into the environment. The present invention reduces or eliminates the excess cooling step in present power plants because the heat is used directly in the treatment of organic waste.

According to an embodiment of the invention, processes are provided that include mixing organic waste with one or more coal combustion by-products (for example from a coal burner or furnace of the power plant or from any other source known to those skilled in the art) to form an organic waste-coal combustion by-product mixture, preferably having a pH of at least 9.5, even more preferably having a pH of at least 10. As set forth in a U.S. Provisional Application filed on Apr. 20, 2001 entitled "Methods for Controlling Ignitability of Organic Waste with Mineral By-Products", which is hereby incorporated by reference herein in its entirety, the addition of coal combustion by-product to organic waste prior to drying is preferred in that it may serve to prevent fires and explosions that are common in conventional organic materials drying.

The next step in this embodiment includes drying with heat the organic waste-coal combustion by-product mixture to preferably at least 50% solids, more preferably at least 75% solids, even more preferably at least 90% solids. According to an embodiment of the invention, the mixture is dried to at least 95% solids, preferably as near 100% solids as possible, thus forming a "dried organic waste-coal combustion by-product mixture." The drying causes ammonia to be liberated from the organic waste.

According to certain embodiments the organic waste is sufficiently dry without a drying step that no drying step is required for ammonia to be liberated from the organic waste. For example, some poultry manures include 70% or more solids. Accordingly, the present invention includes mixing organic waste with one or more coal combustion by-products to form an organic waste-coal combustion by-product mixture, which releases ammonia from the organic waste upon mixing.

The liberated ammonia is then introduced into a coal burner of a coal burning power plant, preferably for $NO_x$ removal. Alternatively, the ammonia may be introduced to the coal burner for a purpose other than $NO_x$ removal that would be apparent to those skilled in the art.

Under certain conditions, such as at pH conditions greater than about 9.5 or greater than about 10.0, and under dry and hot conditions, the ammonia in these wastes is converted to free gaseous ammonia. Organic wastes that are particularly suitable for use in this embodiment of the present invention contain ammonia that is liberated under certain conditions (such as when the organic waste is in a mixture having pH's above about 9.5 or above about 10.0).

Examples of organic waste that may be used in accordance with the present invention include, but are not limited to, sewage sludges, such as dewatered sewage sludge filter cake; various animal manures; pulp and paper waste; shredded paper and cardboard; fermentation waste; food waste; and other industrial organic waste as would be apparent to those skilled in the art. In particular, organic waste such as sewage sludges, animal manures, fermentation biomass, and some food waste are high in protein and ammonia, and thus, are preferred in embodiments of the present invention that involves liberating ammonia from the waste. What is meant by the named types of waste would be readily apparent to those skilled in the art.

Coal combustion by-products may include one or more by-products from a coal burner (preferably from the coal burner from which $NO_x$ may be removed by the processes of the present invention) or coal combustion by-products from other sources. Examples of coal combustion by-products according to the present invention include, but are not limited to the following by-products: fly ash, bottom ash, fluidized bed ash, flue gas desulfurization by-products, lime, calcium hydroxide, and calcium carbonate, and combinations or mixtures thereof. In particular, preferred coal combustion by-products include alkaline mineral by-products. As set forth herein, certain embodiments of the present invention include one or more alkaline mineral by-products in addition to the one or more coal combustion by-products that may include alkaline mineral by-products.

Fly ashes are the mineral residues of burning coal for electricity generation. Fly ash can be collected from the smoke stack of a burner (or furnace) by bag houses, electrostatic precipitators, or in down washes. Fly ashes have variable fineness, solids content, and chemical composition. Preferable fly ashes for use in the present invention are dry ashes. The chemical composition of ash depends on the type of coal that is burned. For example, coals from the western U.S. are typically high in calcium and thus, may contain a higher lime content than coals from the eastern U.S. Eastern coals are often higher in pyrite ($FeS_2$), which oxidizes on burning to $SO_2$, producing an acidic fly ash. Fly ashes are high in silicon, and are often in the form of a spherical glass. Some fly ashes are high in residual carbon in the form of charcoal and these are effective in absorbing biosolids odors. Preferably, odors of the present processes and systems are kept sufficiently low that the present processes and systems are not unacceptable to plant operators, or others working at or near the plant. Thus, the amount of coal combustion by-products (or other ingredients to the mixture) that control odor level, such as fly ash, for example, is preferably adjusted to as to maintain an acceptable odor level.

Fluidized bed ash (FBA) refers to ash that is produced in a fluidized bed burner, in which a mixture of pulverized coal and limestone is burnt as a suspended, i.e., fluid, mass, the purpose of the limestone being to react with $SO_2$ produced from the oxidation of pyrite in the coal.

Flue gas desulfurization by-product (FGD) is a general term referring to a range of products formed when lime or limestone are used to remove $SO_2$ produced from the oxidation of pyrite in the coal. FGDs may be pure gypsum ($CaSO_4.2H_2O$), anhydrite ($CaSO_4$), or $CaSO_3$. FGDs may also contain fly ash, unburnt carbon and unreacted lime.

Lime (CaO), calcium hydroxide ($Ca(OH)_2$), and limestone, as calcite ($CaCO_3$) or dolomite ($CaMg(CO_3)$, limestone, cement kiln dust, lime kiln dust and FGD are alkaline by-products familiar to those skilled in the art, many of which are commercially available.

Figure 1:
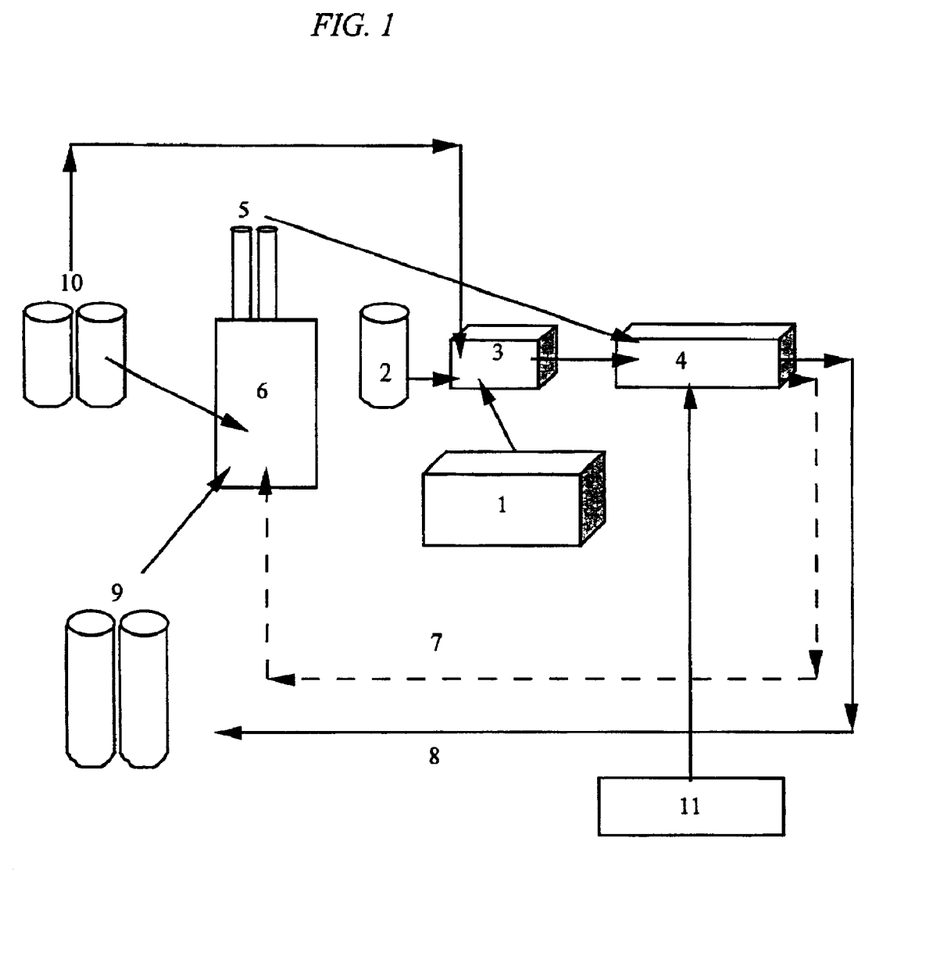
FIG. 1 is a flow diagram of an organic waste drying and fuel feed system according to an embodiment of the present processes and systems.

An embodiment of the processes of the present invention is depicted in FIG. 1. As shown in FIG. 1, organic waste from source 1 and one or more coal combustion by-products from source 2 are added to a mixer 3 in which the organic waste and coal combustion by-products are mixed with one another to form an organic waste-coal combustion by-product mixture, preferably having a pH of at least about 9.5, even more preferably at least 10. According to one embodiment of the present invention, the mixing additionally includes mixing lime with the organic waste and coal combustion by-products. The organic waste-coal combustion by-product mixture is then transferred to a dryer 4. Alternatively, the organic waste and coal combustion by-products are mixed directly in the dryer 4 eliminating the need for a separate mixer 3.

Next, according to the embodiment depicted in FIG. 1, the dryer 4 dries the organic waste-coal combustion by-product mixture to preferably at least 50% solids, more preferably at least 75% solids, even more preferably at least 90% solids, forming a dried organic waste-coal combustion by-product mixture. However, certain embodiments of the present invention do not require drying, such as in the case of organic wastes that are already sufficiently dry that mixing alone causes release of ammonia from the organic waste.

Commercial dryers that may be used to accomplish drying, are available in two forms, direct and indirect. A dryer according to the present invention may include at least one direct dryer or indirect dryer. Direct dryers use heated air in direct contact with the organic waste. According to one embodiment, exhaust stack gases from the power plant are used directly, or waste steam, hot ash, or hot water from the power plant is used with a heat exchanger to heat air for drying.

Alternatively, indirect dryers may be used for drying, which heat metal surfaces that come in contact with the organic waste. In an example of this embodiment, waste steam or hot water from the power plant is used to heat the drying surfaces via a heat exchanger in which the waste steam or water is used to heat oil, the fluid normally used in indirect dryers. Non-limiting examples of suitable dryers according to the present invention include direct concurrent flow dryers, horizontal single, double and triple pass indirect dryers, and vertical counter flow rotating disk indirect dryers.

The heat for the drying may include using waste heat 5 from the coal burning power plant in addition to or instead of heat from another source, such as a steam turbine 11 in the embodiment depicted in FIG. 1. As indicated above, the power plant waste heat 5 used in the drying may be in the form of hot exhaust gases, hot ash, steam or hot water, for example, and may be used with direct or indirect dryers.

When hot ash is a source of heat for the drying, hot ash may be provided from a power plant, for example from the boiler of a power plant. Either the heat of the hot ash may be used via some sort of dryer and/or heat exchanger to heat the mixture, and/or hot ash may be added directly to the mixture to dry it. That is, no heat exchanger is necessary. For example, hot ash from a silo or other source may be mixed in a mixer with the organic waste mixture and through tumbling, heat from the hot ash dries the mixture. The hot ash may be in any form known to those skilled in the art.

Drying the mixture of organic waste and coal combustion by-products, preferably at a pH above 9.5 or 10, preferably causes ammonia to be liberated from the organic waste. The liberated ammonia of this embodiment is introduced as shown in stream 7, into a coal burner 6.

The liberated ammonia that is introduced to the coal burner by the present processes and systems, may supplement commercial anhydrous ammonia or urea added to the coal burner for any purpose, such as $NO_x$ removal. The amount of ammonia or urea may vary depending, for example, on the amount of ammonia or urea needed in order to reduce the $NO_x$ emissions of a particular power plant to a desired (or required) level. The amount of ammonia or urea to be introduced to the coal burner may be determined by those skilled in the art.

In some embodiments, the mixture of organic waste and coal combustion by-products resulting from the present processes may not produce ammonia. In these embodiments, the mixture may be useful for other purposes, for example as a fuel source or soil additive.

Drying may produce exhaust gases, in addition to the ammonia and dried organic waste-coal combustion by-product mixture. According to an embodiment of the present invention, the process includes reacting scavenged exhaust gases from the drying step with at least one reactive material to decrease the amount of polutant gases, such as $CO_2$, $SO_2$ and/or $SO_3$ in the exhaust gases, preferably decreasing emissions from the drying step. Examples of suitable reactive materials would be apparent to those skilled in the art upon reading the present disclosure. Such reactive materials may include, for example, $Ca(OH)_2$.

An embodiment of the present invention includes a process where the coal combustion by-product preferably includes an alkaline mineral by-product and the drying step produces a further by-product. Thus, an embodiment includes mixing organic waste with at least one coal combustion by-product, which preferably includes at least one alkaline by-product, to form an organic waste-coal combustion by-product mixture and at least one further by-product. Another embodiment includes mixing organic waste with at least one coal combustion by-product, which preferably includes at least one alkaline by-product, to form an organic waste-coal combustion by-product mixture, which is then dried with heat to at least 50% solids, to form a dried organic waste-coal combustion by-product mixture and at least one further by-product.

A further embodiment of the present invention includes further by-products produced these processes. The further by-products may be useful, for example, as soil additives that may replace or be added in addition to agricultural limestone, for example, to neutralize soil acidity.

Another embodiment of the present invention includes the preferably dried, organic waste-coal combustion by-product mixture formed by the above-described processes. This mixture may be added to a coal burner of a power plant as depicted for example as feed stream 8 in FIG. 1. A preferred embodiment includes forming a dried organic waste-coal combustion by-product mixture by a process that includes mixing organic waste with coal combustion by-products to form an organic waste-coal combustion by-product mixture, and drying the organic waste-coal combustion by-product mixture to at least 50% solids, preferably at least 75% solids, even more preferably at least 90% solids. The mixture may be used for example, as a soil additive or as a feed-stock to another process.

The processes of producing organic waste-coal combustion by-product mixture of the present invention do not necessarily release ammonia from the organic waste. For example, according to an embodiment of the invention, the coal combustion by-product is non-alkaline fly ash, which is mixed with organic waste to form an organic waste-non-alkaline fly ash mixture that is then optionally dried. The dried organic waste-non-alkaline fly ash mixture may be used for various purposes, for example, to control burning at the power plant and/or to control odors.

A further embodiment of the present invention includes feeding the (preferably dried) organic waste-coal combustion by-product mixture to a coal burner, preferably as supplemental fuel, along with coal. The organic waste-coal combustion by-product mixture may be suitable as a supplemental fuel because its caloric content is similar to that of coal. For example, undigested sewage sludge has a caloric content similar to that of coal, approximately 10,000 BTU per pound. The dried organic waste-coal combustion by-product mixture is preferably mixed with the coal prior to being fed to the coal burner. Preferably, the coal is pulverized coal.

A further embodiment of the present invention includes methods of changing the physical characteristics of organic wastes to be more compatible with pulverized coal. Organic wastes that have solids contents of 50% or greater have much lower densities than coal. They may also have to undergo additional costly processing, such as pelletization, before they can be mixed with coal and burned. The methods of the present invention include mixing organic waste with one or more mineral additives such as one or more coal combustion by-products, or one or more alkaline additives or combinations thereof to form organic waste mixtures having densities that are more similar to coal than the organic wastes alone. In addition, mixtures of organic wastes and mineral additives have granular characteristics that make the mixtures more physically compatible with coal. Also included in this embodiment are organic waste mixtures that exhibit an improved compatibility with pulverized coal, preferably formed by mixing organic waste with one or more mineral additives, such as one or more coal combustion by-products, or one or more alkaline additives or combinations thereof.

An example of this embodiment is also depicted in FIG. 1. According to FIG. 1, the preferably dried, organic waste-coal combustion by-product mixture leaves the dryer 4 and is carried in stream 8 to the coal feed 9 where the coal feed is mixed with the dried organic waste-coal combustion by-product mixture prior to being introduced to the coal burner 6.

The present invention is further directed to systems including a coal burner of a power plant, a coal feed supplying coal to the coal burner, and an ammonia feed to the coal burner. The ammonia feed preferably includes ammonia liberated upon drying an organic waste-coal combustion by product mixture to at least 50% solids The steps involved in these systems, such as mixing and drying the organic waste, and the ingredients of the system, such as the organic waste and coal combustion by-products, are as described above with regard to the processes of the present invention. According to a preferred embodiment, the coal feed includes coal and a dried mixture of organic waste and one or more coal combustion by-products. Preferably, the coal is pulverized coal. According to a further embodiment, the coal and the dried mixture of organic waste and coal combustion by-product are mixed and then pulverized.

A further embodiment of the invention is directed to systems including a coal burner of a power plant, and a feed of an organic waste-coal combustion by-product mixture to the coal burner, where the feed includes organic waste and one or more coal combustion by-products mixed together and optionally dried. According to a preferred embodiment, the feed of organic waste-coal combustion by-product mixture further includes coal. Preferably, the coal is pulverized coal. According to a further embodiment, the coal and the dried mixture of organic waste and coal combustion by-product are mixed and then pulverized.

Other systems of the present invention include a coal burner of a coal burning power plant; an ammonia feed to the coal burner, which preferably includes ammonia liberated upon mixing an organic waste and one or more coal combustion by-products and/or drying such a mixture to at least 50% solids; and a coal feed supplying coal to the coal burner, which coal feed includes coal and the mixture of organic waste and coal combustion by-product.

Under certain conditions, when organic waste is mixed with one or more coal combustion by-products (such as fly ash), and optionally one or more alkaline additives, ammonia in the organic waste may be converted to free gaseous ammonia, without the need for drying the mixture.

Therefore, according to another embodiment of the invention, processes are provided that include mixing organic waste with one or more coal combustion by-products (for example from a coal burner or furnace of the power plant or from any other source known to those skilled in the art) and optionally one or more alkaline additives, preferably causing ammonia to be liberated from the organic waste. The liberated ammonia of this embodiment is introduced into a coal burner of a coal burning power plant. As set forth above with regard to other embodiments of the invention, the liberated ammonia is then preferably introduced to the coal burner. Organic waste and the one or more coal combustion by-products according to these embodiments are as set forth above with regard to other embodiments of the present invention. Preferably, the one or more coal combustion by-products of this embodiment include at least one of fly ash, bottom ash and fluidized bed ash, more preferably fly ash.

Alkaline additives according to the present invention, include but are not limited to lime (CaO), calcium hydroxide $(Ca(OH)_2)$, and limestone, such as calcite $(CaCO_3)$ or dolomite $(CaMg(CO_3))$, cement kiln dust and lime kiln dust. Preferably, the alkaline additives are selected in kind and amount so as to be sufficient to cause ammonia to be released from organic waste upon mixing with the organic waste and one or more mineral by-products, or upon heating the organic waste and one or more mineral by-products.

Figure 2:
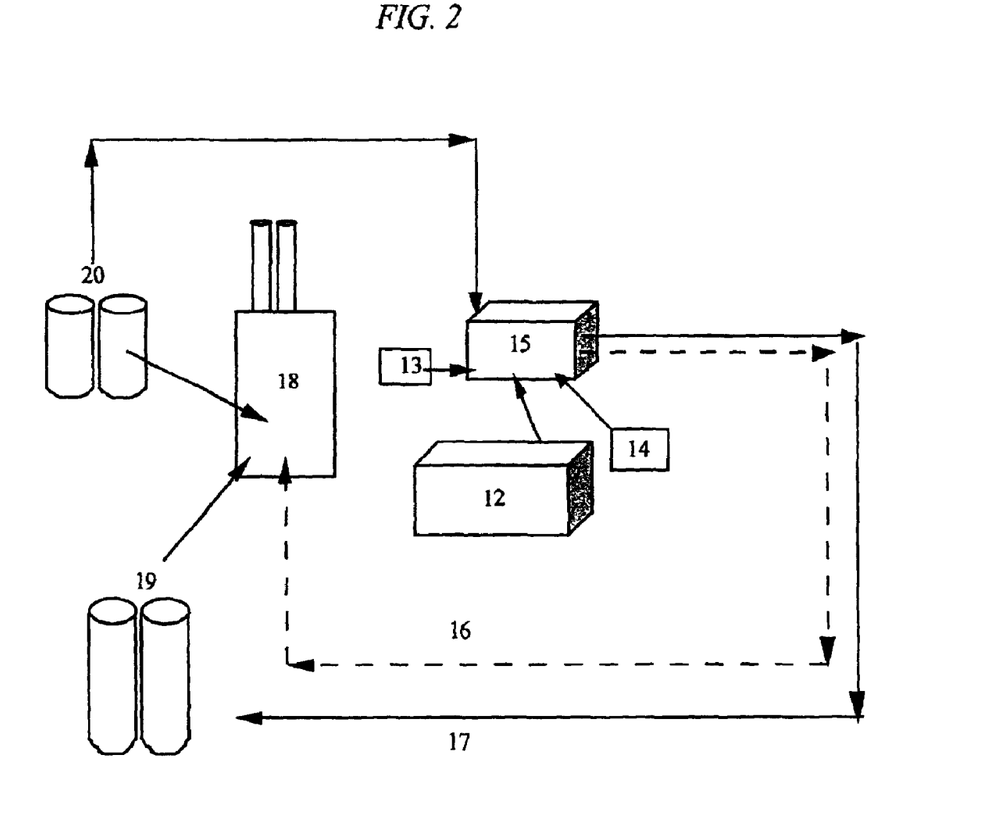
FIG. 2 is a flow diagram of the organic waste mixing and fuel feed system of another embodiment of the present processes and systems.
Figure 3:
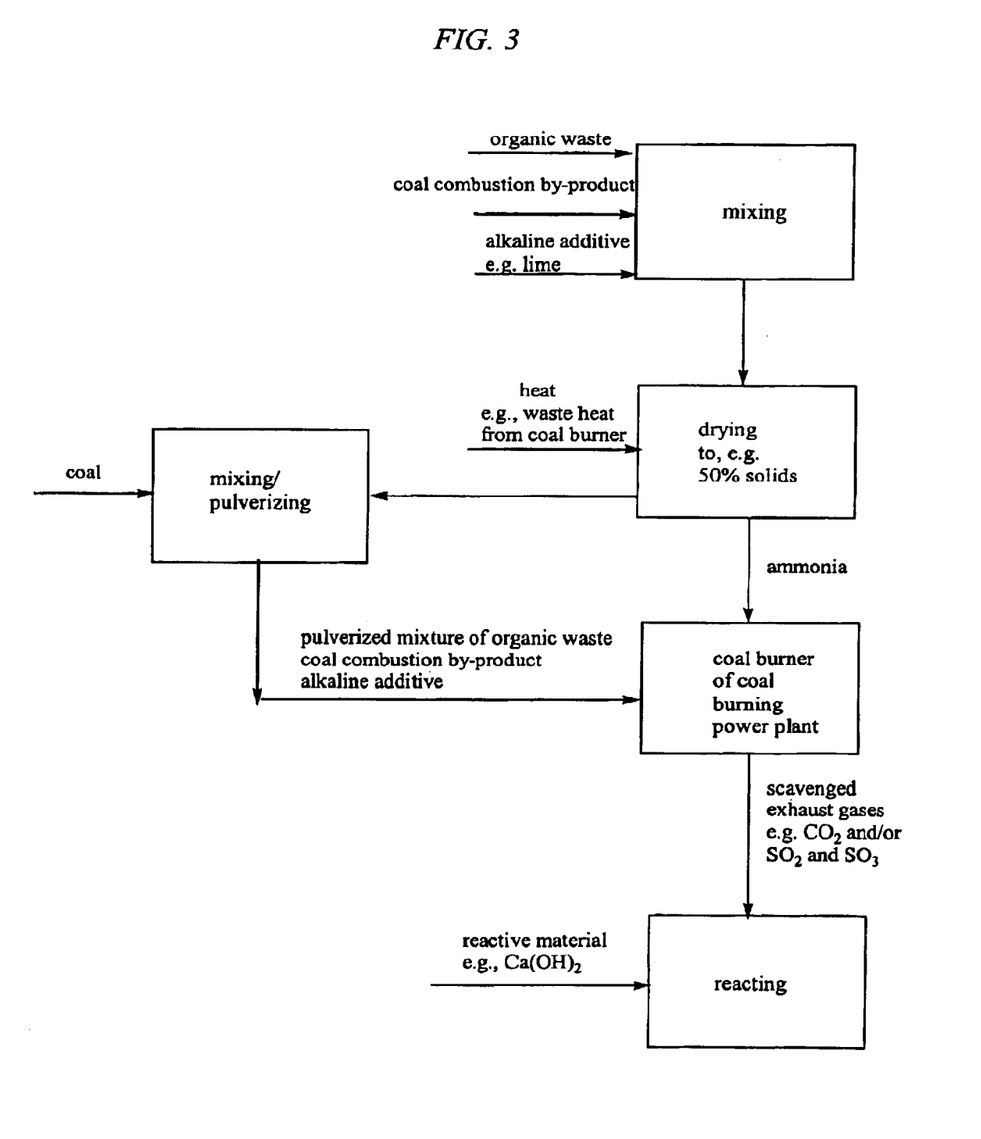
FIG. 3 is a flow chart specifying the steps of the disclosed process.

An embodiment of the processes of the present invention is depicted in FIG. 2. As shown in FIG. 2, organic waste from source 12, coal combustion by-products from source 13, and one or more alkaline additives from source 14 are added to a mixer 15 in which the organic waste, coal combustion by-products and alkaline additives are mixed with one another to form an organic waste/coal combustion by-products/alkaline additive mixture.

The organic waste/coal combustion by-products/alkaline additive mixture may optionally be transferred from the mixer to a dryer (not shown) to dry the mixture such that it preferably contains at least 50% solids, more preferably at least 75% solids, even more preferably at least 90% solids, forming a dried organic waste-coal combustion by-product mixture. Dryers and heat sources that may be used to accomplish such drying, are as described above.

Mixing the organic waste, coal combustion by-products and alkaline additives preferably causes ammonia to be liberated from the organic waste. In embodiments, where ammonia is liberated from the organic waste, the liberated ammonia is preferably fed into the coal burner, for example in FIG. 2 ammonia is introduced as shown in stream 16, into a coal burner 18.

The liberated ammonia that is introduced to the coal burner 18 by the present processes, may supplement commercial anhydrous ammonia or urea added to the coal burner for any purpose, such as for $NO_x$ removal. Alternatively, the ammonia may be introduced to the coal burner for a purpose other than $NO_x$ removal that would be apparent to those skilled in the art. The amount of ammonia or urea may vary depending, for example, on the amount of ammonia or urea needed in order to reduce the $NO_x$ emissions of a particular power plant to a desired (or required) level. The amount of ammonia or urea to be introduced to the coal burner for $NO_x$ removal may be determined by those skilled in the art.

Exhaust gases (other than ammonia, such as $CO_2$, $SO_2$, and $SO_3$) may be produced by mixing the organic waste, coal combustion by-products and alkaline additives or by drying the resulting mixture. According to an embodiment of the present invention, a process is provided that includes reacting scavenged exhaust gases from a mixing or drying step with at least one reactive material to decrease the amount of polutant gases, such as $CO_2$, and other exhaust gases, such as $SO_2$ and $SO_3$, in the exhaust gases and thereby decrease any emissions from the mixing or drying steps. Examples of suitable reactive materials would be apparent to those skilled in the art upon reading the present disclosure. Such reactive materials may include, for example, $Ca(OH)_2$.

According to an embodiment of the invention, the coal combustion by-products mixed with organic waste and alkaline additives may be provided in whole or in part from a burner or furnace (such as coal burner 18 of FIG. 2).

Another embodiment of the present invention includes an organic waste/coal combustion by-products/alkaline additive by-product mixture formed by the above-described processes. This mixture may be used for example, as a soil additive or as a feed-stock to another process or may be added to a coal burner of a power plant as depicted for example as feed stream 17 in FIG. 2. The mixture may also be used to control odor and/or burning in the plant. A preferred embodiment includes forming a organic waste/coal combustion by-products/alkaline additive by-product mixture by a process that includes mixing organic waste with coal combustion by-products and at least one alkaline additive to form an organic waste/coal combustion by-products/alkaline additive by-product mixture. The mixture is then optionally dried to at least 50% solids, preferably at least 75% solids, even more preferably at least 90% solids.

Another embodiment of the present invention includes feeding the organic waste/coal combustion by-products/alkaline mixture to a coal burner, preferably as supplemental fuel, along with coal. The organic waste/coal combustion by-products/alkaline additive by-product mixture may be suitable as a supplemental fuel because its caloric content is similar to that of coal. The organic waste/coal combustion by-products/alkaline additive by-product mixture is preferably mixed with the coal prior to being fed to the coal burner. Preferably, the coal is pulverized coal.

An example of this embodiment is also depicted in FIG. 2. According to FIG. 2, the organic waste/coal combustion by-products/alkaline additive by-product mixture leaves the mixer 15 (or the dryer—not shown) and is carried in stream 17 to the coal feed 19 where the coal feed is mixed with the organic waste/coal combustion by-products/alkaline additives by-product mixture before being introduced to the coal burner 18.

Further embodiments of the present invention include feeding an organic waste/coal combustion by-products mixture that does not necessarily include alkaline additives to a coal burner, preferably as supplemental fuel, along with coal. In these embodiments, the mixture may include one or more alkaline or non-alkaline additives or no additives at all. By way of example, the present invention includes a process that includes mixing organic waste (such as pulp and paper waste) with one or more coal combustion by-products (such as non-alkaline fly ash), and optionally one or more non-alkaline additives that would be apparent to those skilled in the art, and feeding the organic waste/coal combustion by-product/non-alkaline additive mixture to a coal burner of a coal burning power plant. The organic waste/coal combustion by-products mixture is preferably mixed with the coal prior to being fed to the coal burner. Preferably, the coal is pulverized coal.

A preferred embodiment of the present invention includes a process that includes mixing organic waste with coal combustion by-products and alkaline additives, thus producing ammonia, and introducing liberated ammonia from the organic waste into the burner, preferably for $NO_x$ removal. Preferably the organic waste/coal combustion by-products/alkaline additive by-product mixture is mixed with pulverized coal as supplemental fuel for the coal burner.

In an embodiment of the invention, lime is added to organic waste to achieve a pH preferably greater than 9.5, more preferably greater than 10, and to aid in drying to high solids, in embodiments where the organic waste is dried. Hot exhaust gases, hot ash, steam, hot water, or a combination of these heat sources scavenged from the power plant may be used to dry, in a direct or indirect dryer, the coal combustion by-products-organic waste mixture to a solids content of at least 95%, preferably near 100%. Exhaust gases from the dryer, containing free ammonia from the organic waste, are piped into the coal burner to supplement ammonia addition to the coal burner for $NO_x$ removal. Preferably, the dried mixture is conveyed to the coal feed area of the power plant and mixed with coal prior to or after coal pulverization to serve as a supplemental fuel source. Alternatively, the dried mixture can be used as a soil additive.

The present invention is further directed to systems including a coal burner of a power plant, a coal feed supplying coal to the coal burner, and an ammonia feed to the coal burner. The ammonia feed preferably includes ammonia liberated from organic waste upon mixing organic waste, coal combustion by-products and one or more alkaline additives. The step(s) involved in these systems, such as mixing and optionally drying the organic waste, and the ingredients of the system, such as the organic waste, coal combustion by-products and alkaline additive(s), are as described above with regard to the processes of the present invention. According to a preferred embodiment, the coal feed includes coal and a mixture of organic waste, coal combustion by-products and alkaline additive(s). Preferably, the coal is pulverized coal. According to a further embodiment, the coal and the mixture of organic waste, coal combustion by-products and alkaline additive(s) are mixed and then pulverized.

A further embodiment of the invention is directed to systems including a coal burner of a power plant, and a feed of an organic waste/coal combustion by-product/alkaline additive mixture to the coal burner, where the feed includes organic waste, coal combustion by-products and one or more alkaline additives mixed together. According to a preferred embodiment, the feed of organic waste/coal combustion by-products/alkaline additive by-product mixture further includes coal. Preferably, the coal is pulverized coal. According to a further embodiment, the coal and the organic waste/coal combustion by-products/alkaline additive by-product mixture are mixed and then pulverized.

Other systems of the present invention include a coal burner of a coal burning power plant, an ammonia feed to the coal burner, which preferably includes ammonia liberated upon mixing organic waste, coal combustion by-products, and one or more alkaline additives; and a coal feed supplying coal to the coal burner, which coal feed includes coal and the organic waste/coal combustion by-products/alkaline additive by-product mixture.

The present invention will now be described in detail with respect to showing how certain specific representative embodiments thereof can be made, the materials, apparatus and process steps being understood as examples that are intended to be illustrative only. In particular, the invention is not intended to be limited to the processes, materials, conditions, process parameters, apparatus and the like specifically recited herein.

EXAMPLES

Example 1

An anaerobically digested sewage sludge is mixed with spent fluidized bed coal ash containing 10% by weight CaO at a coal-fired power plant burning high-S coal. Fly ash and sludge are mixed to form a mixture having a pH of 12 or above. The mixture is introduced into a vertical countercurrent indirect dryer with rotating plates in which the rotating plates are heated with excess steam from the power plant. The sludge contains 2% by dry weight of ammonia. Due to the high pH, ammonia is released from the sludge in the dryer and is exhausted and piped to the coal burner to supplement anhydrous ammonia or urea used for $NO_x$ control from the coal burner. The mixture is dried to >95% solids.

The dried mixture is conveyed by covered belt to the coal feed hopper where it is further mixed with coal. This mixture is fed into the coal pulverizer and thence into the burner. The mixing of high CaO fly ash with sludge results in the formation of $Ca(OH)_2$. The concurrent introduction of exhaust air from the plant results in carbonation of the $Ca(OH)_2$ to form $CaCO_3$. The presence of $CaCO_3$ in the dried mixture reduces the amount of commercial limestone required by the power plant for sulfur removal.

Example 2

An anaerobically digested sewage sludge is mixed with fly ash (containing CaO) and lime kiln dust at a coal-fired power plant burning high-S coal. The resulting mixture has a pH of 10 or above. Ammonia is released from the sludge in the mixer and is exhausted and piped to the coal burner to supplement anhydrous ammonia or urea used for $NO_x$ control from the coal burner.

The mixture is conveyed by covered belt to the coal feed hopper where it is further mixed with coal. This mixture is fed into the coal pulverizer and thence into the burner. The mixing of high CaO fly ash with sludge results in the formation of $Ca(OH)_2$. CaO in the lime kiln dust also results in formation of $Ca(OH)_2$. The concurrent introduction of exhaust air from the plant results in carbonation of the $Ca(OH)_2$ to form $CaCO_3$. The presence of $CaCO_3$ in the dried mixture reduces the amount of commercial limestone required by the power plant for sulfur removal. In addition, $CO_2$ in exhaust gases is sequestered by a reaction of $Ca(OH)_2$ to form $CaCO_3$. In a further embodiment $SO_2$ and $SO_3$ in the exhaust air from the plant are sequestered by reaction with $Ca(OH)_2$ to form $CaSO_3$ and $CaSO_4$.

Processes and systems of the present invention are advantageous over previously known processes because enabling the release of ammonia from organic waste at a power plant allows the ammonia in the organic waste to be utilized for example, for $NO_x$ removal, while taking advantage of the fuel value of the organic waste. The present processes and systems also provide flexibility in resource utilization in that the organic waste mixtures formed by the present processes can be used either as fuel or as a separate product that can be applied to land as a soil additive.

While the present invention is described with respect to particular examples and preferred embodiments, it is understood that the present invention is not limited to these examples and embodiments. In particular, the present invention is not limited to the particular types of waste or by-products. Additionally, the components of the processes of the present invention are not limited to those described above or depicted in FIGS. 1 and 2. For example, the processes of the present invention are not limited to a single dryer or a single coal burner and additional components may be added such as a sorbant 10 in FIG. 1, heat exchangers, belts, and the like.

The present invention as claimed therefore, includes variations from the particular examples and preferred embodiments described herein, as will be apparent to one of skill in the art.

We claim:

1. A process comprising mixing organic waste, one or more coal combustion by-products, and one or more alkaline additives to form an organic waste/coal combustion by-products/alkaline additive by-product mixture;

drying said organic waste/coal combustion by-products/ alkaline additive by-product mixture with heat, causing ammonia to be liberated from said organic waste;

introducing said liberated ammonia into a coal burner of a coal burning power plant; and, reacting scavenged exhaust gases from the power plant with at least one reactive material so as to reduce $CO_2$ emissions from the power plant and/or to reduce $SO_2$ and $SO_3$ emissions from the vower plant.

2. The process of claim 1, wherein the heat for said drying includes waste heat from said coal burning power plant.

3. The process of claim 1, wherein said drying comprises drying the organic waste/coal combustion by-products/ alkaline additive by-product mixture to at least 50% solids.

4. The process of claim 1, wherein said drying comprises drying the organic waste/coal combustion by-products/ alkaline additive by-product mixture to at least 75% solids.

5. A process comprising mixing organic waste, one or more coal combustion by-products, and one or more alkaline additives to form an organic waste/coal combustion by-products/alkaline additive by-product mixture;

drying said organic waste/coal combustion by-products/alkaline additive by-product mixture with heat, causing ammonia to be liberated from said organic waste;

introducing said liberated ammonia into a coal burner of a coal burning power plant; and reacting scavenged exhaust gases from the power plant with at least one reactive material comprising $Ca(OH)_2$ so as to decrease the amount of pollutant gases in said exhaust gases.

6. A process comprising mixing organic waste with one or more coal combustion by-products to form an organic waste-coal combustion by-product mixture;

drying with waste heat from a coal burning power plant the organic waste-coal combustion by-product mixture to at least 50% solids forming a dried organic waste-coal combustion by-product mixture and causing ammonia to be liberated from said organic waste; and introducing said liberated ammonia into a coal burner of a coal burning power plant.

7. The process of claim 6, wherein the organic waste-coal combustion by-product mixture has a pH of at least 9.5.

8. The process of claim 6, wherein said mixing further includes mixing lime with the organic waste and coal combustion by-products.

9. The process of claim 6, wherein said organic waste comprises waste selected from the group consisting of sewage sludges, animal manures, pulp and paper waste, fermentation waste, food waste, paper and cardboard, other industrial organic waste, and mixtures thereof.

10. The process of claim 6, wherein said coal combustion by-products comprise at least one by-product selected from the group consisting of fly ash, fluidized bed ash, flue gas desulfurization by-products, lime, calcium hydroxide, calcium carbonate, and mixtures thereof.

11. The process of claim 6, wherein drying takes place in at least one dryer.

12. The process of claim 11, wherein said dryer is selected from the group consisting of direct concurrent flow dryers, horizontal single, double and triple pass indirect dryers, and vertical counter flow rotating disk indirect dryers.

13. The process of claim 6, wherein said drying is conducted using a direct dryer.

14. The process of claim 6, wherein said drying is conducted using an indirect dryer.

15. The process of claim 6, wherein said drying comprises drying the organic waste-coal combustion by-product mixture to at least 75% solids.

16. The process of claim 6, wherein when said coal combustion by-product comprises an alkaline mineral by-product, the drying step produces a further by-product.

17. The process of claim 6, further comprising mixing the dried organic waste-coal combustion by-product mixture with coal.

18. The process of claim 17, wherein the coal is pulverized coal.

19. The process of claim 17, further comprising feeding the mixture formed by mixing the by-product with coal into said coal burner.

20. A process comprising mixing organic waste with one or more coal combustion by-products to form an organic waste-coal combustion by-product mixture;

drying with heat the organic waste-coal combustion by-product mixture to at least 50% solids forming a dried organic waste-coal combustion by-product mixture and causing ammonia to be liberated from said organic waste;

introducing said liberated ammonia into a coal burner of a coal burning power plant; and reacting scavenged exhaust gases from said drying with at least one reactive material to decrease the amount of $CO_2$, $SO_2$ and $SO_3$ in said exhaust gases and thereby decrease emissions from the drying.

21. The process of claim 20, wherein said reactive material comprises $Ca(OH)_2$.

22. A system comprising a coal burner of a coal burning power plant;

a coal feed supplying coal to said coal burner wherein said coal feed comprises coal and a dried mixture of organic waste and coal combustion by-product and said coal and said dried mixture of organic waste and coal combustion by-product are mixed and then pulverized; and an ammonia feed to said coal burner comprising ammonia liberated from organic waste upon drying a mixture of organic waste and one or more coal combustion by-products.

23. A system comprising a coal burner of a coal burning power plant;

a coal feed supplying coal and a mixture of organic waste, one or more coal combustion by-products and one or more alkaline additives to said coal burner, wherein said coal and said mixture of organic waste, one or more coal combustion by-products and one or more alkaline additives are mixed and then pulverized; and an ammonia feed to said coal burner comprising ammonia liberated from organic waste upon mixing organic waste, one or more coal combustion by-products and one or more alkaline additives.

* * * * *